May 10, 1949.　　　L. R. SIMPSON　　　2,469,997
WHEEL BALANCE WEIGHT
Filed May 7, 1946
Fig. 1.
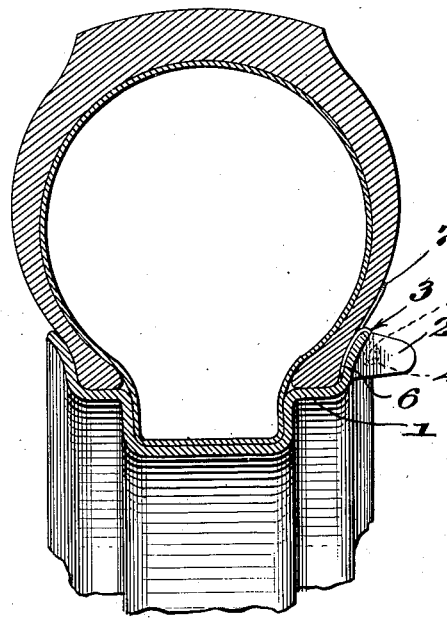
Fig. 3.
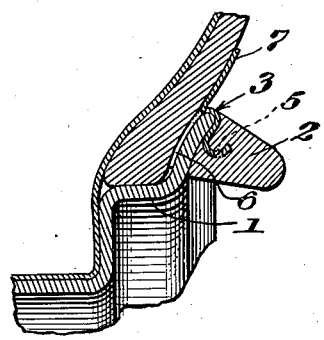
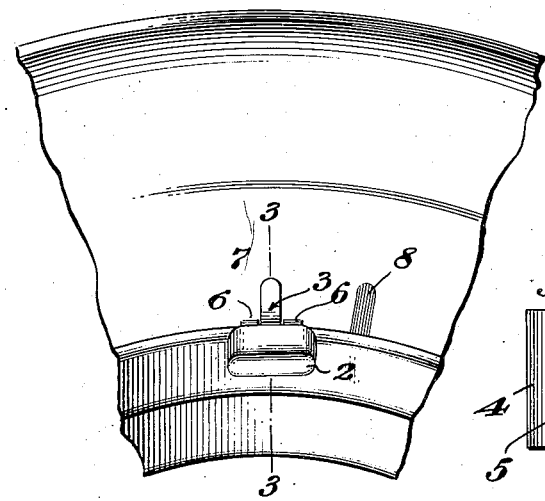
Fig. 4.
Fig. 5.
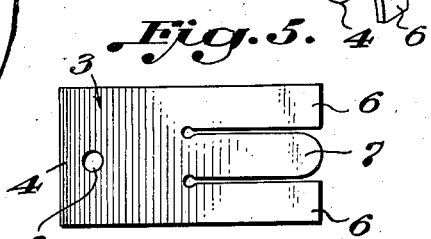
Fig. 2.
Inventor
Leonard R. Simpson,
By Hutchinson & Hutchinson,
Attorney Patented May 10, 1949

2,469,997

UNITED STATES PATENT OFFICE 2,469,997

WHEEL BALANCE WEIGHT

Leonard R. Simpson, Birmingham, Ala.

Application May 7, 1946, Serial No. 667,903

7 Claims. (Cl. 301—5)

1

The present invention relates to balance weights for attachment on the tire retaining flange of a vehicle wheel to balance the unbalanced force which would otherwise result in objectional vibration of the wheel on rotation.

With the advent of high speed performance of automobiles and tires of considerable weight with large diameters, and for other reasons, difficulty is frequently encountered in keeping the automobile traveling in a straight line and under proper rolling performance, and this due mainly to an unbalanced condition of the wheels and particularly the tires carried thereby. In dealing with this well known problem, weights have been employed to counteract the unbalanced effect, and these balancing weights or units are usually of a type where the weight proper is secured to the edge of the tire flange by means of a spring clip which holds said weight against the under side of the rim flange, the clip extending over the lip of the rim down inside thereof between said rim flange and the tire bead.

While these balancing units of this general type are adapted to be readily attached to and removed from their balancing positions upon the tire rim, it is the practice in service upon any particular tired wheel (after the weights have been placed in their proper balancing positions according to existing conditions), to permit the balancing units or weights to be retained and maintained in their fixed adjusted relation upon the rim flange, and therefore not removed therefrom when found necessary to remove the tire from the wheel rim for repair due to puncture, unless, however, the wheel needs further or additional balancing operation, which is not ordinarily the case.

The balancing positions of the weights or units may therefore be maintained in so far as their relation to the wheel rim is concerned, due mainly to this relatively fixed relation of the weights or units upon said rim, but of course proper balance of the wheel cannot be maintained, unless, however, the tire which has been removed for repair, is returned to the rim in the same relative position it previously assumed prior to its removal and after being properly balanced upon the wheel.

Under these conditions, it therefore resolves itself merely into a problem of replacing the tire (after being repaired), to the wheel rim in the same relative position with respect to the balancing weights which it assumed when first properly balanced upon the wheel. However, and notwithstanding the fact that these balancing weights are usually retained in relatively fixed positions with respect to the wheel rim, considerable difficulty is experienced by the owner of the motor vehicle in readily determining at a glance whether or not the tire (after being removed for repair) has been replaced upon its rim in proper balanced relation in so far as the balancing weights are concerned, and this due to the fact that there is no visible identification mark appearing upon the wall of the tire to guide said owner in determining whether the repair man has followed directions to replace such tire in its former and proper balanced condition.

It is therefore the primary purpose and object of the present invention to provide upon the balancing unit a marking member or element, which in use bears against the tire wall at a point above the top edge of the rim flange, and this for the purpose of making an identification mark upon the tire wall which will be clearly visible to an observer and will show up clearly should the tire be placed in other than its former balanced relation to the rim and the weights attached thereto.

For a more complete disclosure of the invention, reference is now made to the following specification, in connection with the accompanying drawing in which:

Fig. 1 is a cross-sectional view through the tire, rim and balancing weight showing the relationship of each;

Fig. 2 is partial elevation of the outside of a rim flange and its tire showing the balancing unit secured in position and the marker member in engagement with the tire wall;

Fig. 3 is a transverse section on the line 3—3 of Fig. 2;

Fig. 4 is a perspective view of the clip element embodying the invention; and

Fig. 5 is a plan view of the blank from which the clip and marker elements are formed.

Referring to the drawings, 1 indicates a tire rim flange having a balancing unit comprising a cast weight 2 clamped to the underside of the flange by a clip member 3 which is suitably attached to said weight in any approved manner. However, as shown, the clip is formed with a weight attaching part 4 of hook shape to be anchored in any suitable manner in a mass of metal, such as lead, to constitute the weight of said balancing unit. Said metal is molded or die cast about the hook-shaped weight attaching part 4 which is provided with an opening 5 through which the metal may be flowed to secure good anchorage on the part 4.

This clip member 3, in one form of production, is made from a flat strip of steel and by suitable operations, it is preferably desired to first form a blank of the character and dimensions as clearly shown in Fig. 5. The blank thus formed is then bent by suitable operations, to the shape as illustrated in Fig. 4, and wherein said clip element 3 consists of a part 4 to which the weight is attached as above described; also two downwardly bent fingers 6, 6 spaced from the part 4 and its attached weight, and adapted to be accommodated between the inner face of the rim-flange and the outer surface of the tire, and furthermore, said fingers 6, 6 constituting bent continuations of the part 4; a tire-marker element 7 extending upwardly from said part 4 and the fingers 6, 6 where it is adapted to rest against the tire wall at points above the top edge of the rim flange and this of course when the balancing unit is in proper attached position upon the rim flange, thus providing effective means for suitably marking the tire and thereby furnishing a definite means for determining at a glance whether the repaired tire has been returned to the rim in its same balanced relation to the balancing weights as it assumed before removal from the rim for repair. As seen in Fig. 2, the identification mark made upon the tire wall is indicated at 8, and as viewed in this figure, its position with respect to the marker element which made such mark, clearly indicates that the tire has not been returned to the rim in its proper balanced relation to the weights, otherwise the mark would have been covered by the marker element in question. This tire marker element and its relation to the other elements of the balancing unit, is the main and important feature of the present invention.

The fingers 6, 6 may also be provided with suitable detents 9 which can be formed in any preferred manner, said detents being relatively small and extending but a slight distance from the face of the fingers to engage the inner surface of the tire rim flange.

The balancing unit is applied to the tire rim by hooking the fingers 6, 6 of the clip over the flange 1 and then driving it thereover to seat the weight against the lip of said flange to the position as indicated in Figures 1 and 3. The detents 9 will bite into the metal of the rim and finally become seated therein under the influence of the pressure exerted by the tire casing continually pushing against the clip member.

This invention as defined and measured by the appended claims is not limited and restricted to the precise and exact details of structure shown and described because modifications or changes may be resorted to without departure from the heart and essence of the invention and without the sacrifice of any of its material benefits and advantages.

What I claim is:

1. In a wheel balance weight for engagement over the edge of a tire rim flange, the combination of a weight, a spring clip carrying the weight up against the outside of the rim and extending over the edge of the rim down inside thereof in compressive engagement with the rim, and a tire-marker member extending upwardly from said clip and adapted to lie against the outer wall of the tire carried by the rim.

2. In a wheel balance weight for engagement over the edge of a tire rim flange, the combination of a weight, a spring clip carrying the weight up against the outside of the rim and extending over the edge of the rim down inside thereof in compressive engagement with the rim, and a tire-marker member extending upwardly from said clip and adapted to lie against a visible portion of the outer wall of the tire carried by the rim.

3. In a wheel balance weight for engagement over the edge of a tire rim flange, the combination of a weight, a spring clip carrying the weight up against the outside of the rim and extending over the edge of the rim down inside thereof in compressive engagement with the rim, and a tire-marker integrally formed with said clip and extending upwardly from said clip to lie against a visible portion of the outer wall of the tire carried by said rim.

4. In a wheel balance weight for engagement over the edge of a tire rim flange, the combination of a weight, and a clip unit fastened to said weight, said clip unit including as elements thereof, a part to be fastened to the weight, a pair of downwardly bent fingers to be hooked over the edge of the rim flange, and a tire-marker element extending upwardly from the fingers, and adapted to lie against the tire wall above said fingers, for the purposes intended.

5. For balancing a wheel having a rim with an edge extending upwardly and outwardly, the combination of a weight shaped to be confined substantially under the projection of said edge, and a clip carrying the weight and engaging over the edge to extend around and downwardly on the inner side thereof, said clip having a tire marker member integral therewith and extending upwardly therefrom and positioned to lie against the outer wall of the tire above the edge of the tire rim for creating an identifying mark on said tire wall simulating the design of said tire marker member.

6. In a wheel balance weight for engagement over the edge of a tire rim flange, the combination of a weight, and a clip unit fastened to said weight, said clip unit including as elements thereof, a part to be fastened to the weight, a pair of fingers extending in a downward direction from the upper edge of said weight attaching part and in spaced relation thereto to receive the edge of the rim flange therebetween, and a tire-marker member extending upwardly from said weight attaching part between said fingers and adapted when in use to lie against the tire wall for making a visible identifying mark on the tire wall considerably above the edge of said rim flange.

7. In a wheel balance weight for engagement over the edge of a tire rim flange, the combination of a weight, means for retaining said weight on said flange, and a tire-marker element carried by said retaining means and extending upwardly therefrom an appreciable distance above the flange of said rim when the weight is in applied position and adapted to lie against the side wall of the tire, whereby a readily visible indication will be given in the event the tire is removed from the wheel and subsequently replaced thereon in a different relative position with respect to said balance weight.

LEONARD R. SIMPSON.

REFERENCES CITED

The following references are of record in the file of this patent:

UNITED STATES PATENTS

| Number | Name | Date |
| --- | --- | --- |
| 2,049,918 | Marsh | Aug. 4, 1936 |